US009000957B2

(12) United States Patent
Molla

(10) Patent No.: US 9,000,957 B2
(45) Date of Patent: Apr. 7, 2015

(54) ETHIOPIC CHARACTER ENTRY

(76) Inventor: Aberra Molla, Littleton, CO (US)

( * ) Notice: Subject to any disclaimer, the term of this patent is extended or adjusted under 35 U.S.C. 154(b) by 1647 days.

(21) Appl. No.: 12/271,650

(22) Filed: Nov. 14, 2008

(65) Prior Publication Data

US 2009/0179778 A1 Jul. 16, 2009

Related U.S. Application Data

(60) Provisional application No. 61/020,729, filed on Jan. 13, 2008.

(51) Int. Cl.
*H03M 11/00* (2006.01)
*G06F 3/023* (2006.01)
*G06F 3/01* (2006.01)

(52) U.S. Cl.
CPC .............. *G06F 3/0235* (2013.01); *G06F 3/018* (2013.01)

(58) Field of Classification Search
CPC ........... H01H 2217/036; H03M 11/08; H03M 11/10; G06F 3/0235; G06F 3/018
USPC .......................... 341/20, 22, 28; 345/168, 171
See application file for complete search history.

(56) References Cited

U.S. PATENT DOCUMENTS

| | | | |
|---|---|---|---|
| 4,694,280 A | 9/1987 | Rollhaus et al. | |
| 4,891,786 A | 1/1990 | Goldwsser | |
| 5,339,358 A * | 8/1994 | Danish et al. | 379/368 |
| 6,054,941 A | 4/2000 | Chen | |
| 6,130,628 A | 10/2000 | Schneider-Hufschmidt et al. | |
| 6,378,234 B1 | 4/2002 | Luo | |
| 6,430,314 B1 | 8/2002 | Ko | |
| 6,559,778 B1 * | 5/2003 | Hillmering | 341/23 |
| 6,822,585 B1 | 11/2004 | Ni et al. | |
| 7,015,896 B2 * | 3/2006 | Levy et al. | 345/168 |
| 7,170,430 B2 | 1/2007 | Goodgoll | |

OTHER PUBLICATIONS

Alamnhe, "Senamirmir Project", Senamirmir Website, May 15, 2006, last updated on Jul. 10, 2007, available at http://www.senamirmir.com/downloads/washra4-0_manual_en.pdf, pp. 1-12.

* cited by examiner

*Primary Examiner* — Albert Wong
(74) *Attorney, Agent, or Firm* — Sheridan Ross P.C.

(57) ABSTRACT

The present invention is directed to a system and method for typing Ethiopic characters in a computer system using at most two keystrokes. The rendering of characters is based on the timing between a first and second keystroke and on whether the first and second keystroke are, together, one of a predetermined number of ordered key pairs. Conventional symbol typing may be preserved by a prioritized assignment of the symbols to alternative shift keys. A timing disable key may be defined that allows typing of default characters at a comfortable speed.

20 Claims, 7 Drawing Sheets

ETHIOPIC CHARACTER ENTRY

CROSS REFERENCE TO RELATED APPLICATIONS

The present application claims the benefit of U.S. Provisional Patent Application 61/020,729 filed Jan. 13, 2008.

FIELD OF THE INVENTION

The present invention is related to computer entry of characters of a phonetic language having a number of characters exceeding the number of keys available on a standard keyboard.

BACKGROUND OF THE INVENTION

The present invention is directed to the use of computers in writing Geez or Ethiopic, which is the alphabet on which Ethiopian writing is based. Ethiopic or Geez is one of the world's most ancient alphabets and languages. According to the beliefs of the Ethiopian Orthodox church, Ethiopic has a special place in biblical history. The first human to use the alphabet is believed to be Henoch of the Old Testament. Henoch, the Seventh in line from Adam and Eve and the great grandfather of Noah supposedly wrote the Book of Enoch in Ethiopic. Ethiopic is an ebugida meaning that each symbol represents a consonant and vowel combination. The symbols are organized into classes and orders of similar symbols, which are associated with similar sounds. The symbols are organized on the basis of both the consonant and the vowel. Ethiopic is written left to right across the page. These Ethiopic characters have evolved over time from more ancient forms.

There is archeological evidence that the proto-Ethiopic alphabet existed before the $9^{th}$ century BC especially during the D'mt Kingdom in Northern Ethiopia. The ancient character set existed as the Heleheme series having only a first order. The first and last syllographs of Geez, He and Pe are relatively the same in Ancient Egypt as the first and last main Hieroglyphs. The order of the Geez system has remained the same for roughly 3000 years. Some believe that the first character set was an ebugida. Others even claim that the classic Ethiopic with its seven vowel expansions was in existence before 3000 BC. Still others claim that Ethiopic is a Sabean alphabet. It is thought by some that it was during the Axumite Kingdom of around 340 AD that the alphabet gained the vowel forms and started to be written from left to right.

Translation of Bible books into Ethiopic, the ancient Semitic language, contributed to the development of the syllabic alphabet. Gradually, the Geez language started to die out and now remains as a liturgical language of the Ethiopian Orthodox Church. Around the $13^{th}$ century AD, Amharic became the dominant language. As a result, more characters were added to Geez primarily through the influence of the Hamitic languages. In the 1800's the Bible was translated to Amharic and later to Tigrigna and Oromo languages. Since then Ethiopic has added more characters as more languages began using it.

The introduction of the printing press around 1900 encouraged the proliferation of books. Books and newspapers were printed using type-setting technology. Type-setting provided a fairly faithful reproduction of the Ethiopic characters, which prior to the introduction of the printing press, were written by hand. Around 1920 Ayana Birru introduced the Amharic typewriter, which consisted of a modification of the printhead of the familiar English typewriter. While the Amharic typewriter allowed for a widespread production of printed documents, it was not without drawbacks. In particular, using the Amharic typewriter, glyphs were produced by a complicated series of the partial glyphs successively typed over the top of each other. The glyphs thus produced were merely an approximation of the true hand-written Ethiopic characters, which were more faithfully reproduced by a printing press. Thus, despite its utility, the Amharic typewriter, led to the proliferation of sub-standard characters and incomplete Amharic sets.

With the advent of computer technology, it became possible to efficiently produce printed documents having Ethiopic characters without the use of the a printing press. Early attempts at adopting computer technology for this purpose, did not use the true Ethiopic characters, but instead used glyphs similar to those produced by the Amharic typewriter. Accordingly, the full range and variety of Ethiopic characters were not expressed. Concurrently, Dr. Aberra Molla, developed a method of rendering a greater variety of Ethiopic characters. Dr. Molla's method included using the function keys to alter the font in which a default character is rendered. The different fonts indicated, by convention, that different character orders were specified. Switching between languages was with one or two keystrokes.

With improvements to computer technology, it became possible to more faithfully render the true Ethiopic characters. While the problem of rendering true characters had been solved, the problem remained of specifying all the characters using the standard QWERTY keyboard. In particular, Ethiopic has approximately 564 characters, all of which cannot be typed using a standard keyboard, which has far fewer keys. Several schemes have been developed to address this problem. All the schemes developed so far are complicated and non-intuitive and require a great many keystrokes per character. Examples of these Amharic typing schemes can be found online. Accordingly it would be desirable to have an improved system for entering Ethiopic characters into a computer using a standard QWERTY keyboard.

SUMMARY OF THE INVENTION

The present invention is directed to a system and method for typing Ethiopic characters in a computer system. In accordance with the present invention, at most two keystrokes are used to type each character in the complete set of Ethiopic characters. In that regard, a number of related Ethiopic characters are assigned to a particular key, which may be pressed as a first keystroke. A second keystroke, if pressed within a predetermined amount of time, may be considered to modify the first keystroke. Depending on which key was pressed as the second keystroke, one of the related Ethiopic characters is rendered. If the first and second keystrokes do not occur within the predetermined time, the second keystroke does not modify the first keystroke. As a result, two default characters are rendered, one associated with the first keystroke and the other associated with the second keystroke.

A second keystroke is not considered to modify the first keystroke if the second keystroke is not one of a predetermined number of modifier or order specifier keys assigned to the first keystroke. The present invention sets forth a number of key pair assignments that include a number of first keystrokes and the second keystrokes associated with each first keystroke. Typically, the second keystrokes include the vowel keys, the symbol keys, and the number keys. Typing of the conventional symbol on the QWERTY keyboard may be preserved in the present invention. In particular, the symbols are assigned keystroke combinations that include "alternative shift" keys. The shifted and non-shifted symbols are assigned to available alternative shift keys based on a priority scheme in accordance with embodiments of the present invention.

In accordance with embodiments of the present invention, a "timing disable" key is defined. When received within the predetermined time interval after a first keystroke, the timing disable key indicates that the default character associated with first keystroke should be rendered. In this way, a user can type at a comfortable speed without having to wait for the predetermined time interval to expire before typing the next character. A symbol key is typically designated as the timing disable key.

BRIEF DESCRIPTION OF THE DRAWINGS

FIG. 5 is another illustration of keystroke pairs, in accordance with embodiments of the present invention;

FIG. 6 is another illustration of keystroke pairs, in accordance with embodiments of the present invention;

DETAILED DESCRIPTION

Figure 1:
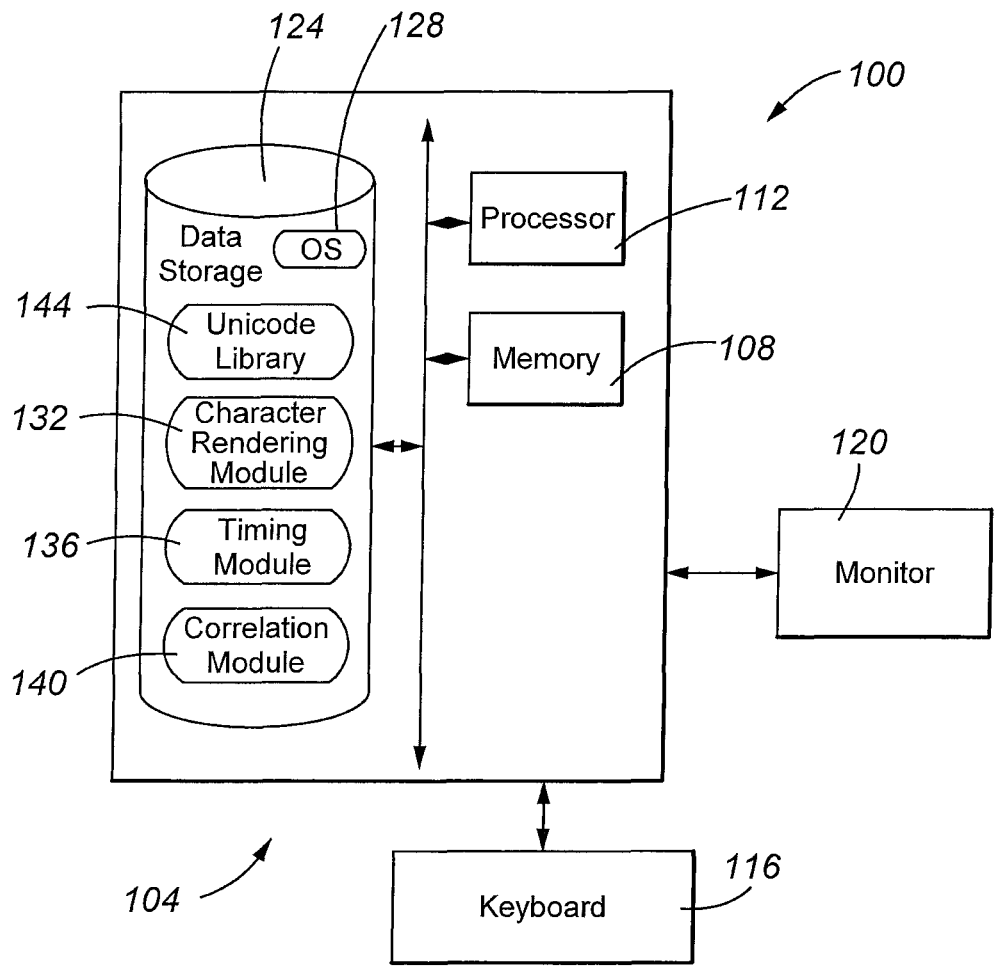
FIG. 1 is an illustration of system in accordance with embodiments of the present invention.

The present invention is directed to a system and method for entering phonetic characters in a computational device using at most two keystrokes. For example, embodiments of the present invention are used to enter Ethiopic characters. The system 100 may include a computational device, such as a personal computer, identified in FIG. 1 with reference numeral 104. A computational device 104 may include memory 108 for use in connection with the execution of programming by a processor 112 and for the temporary or long-term storage of data or program instructions. The memory 108 may comprise solid-state memory resident, removable or remote in nature, such as DRAM and SDRAM. Where the processor 112 comprises a controller, the memory 108 may be integral to the processor 112.

In addition, various user input devices and user output devices may be provided. By way of illustration and not limitation, the computational device 104 shown in FIG. 1 includes a keyboard 116 input device and a monitor or display 120 output device. Other examples of input devices, which may be used in connection with the computational device 104 include a numeric keypad, a microphone and pointing device or other position encoder combined with a monitor, or touch screen. Examples of other user output devices, which may be used in connection with the computational device 104 include an alphanumeric display, ringer, printer port, speaker or indicator lights.

Figure 2:
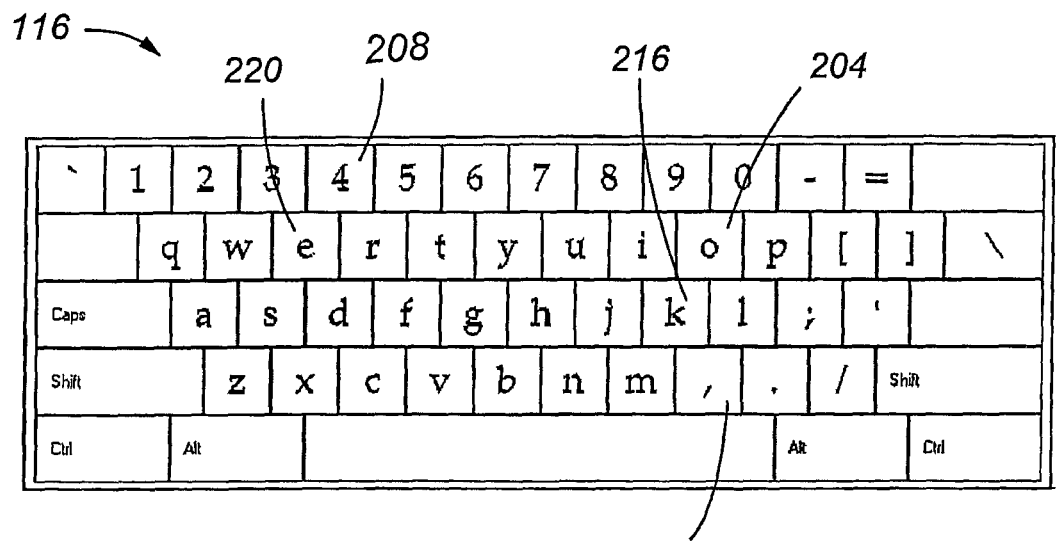
FIG. 2 is an illustration of a default QWERTY keyboard as known in the prior art.

FIG. 2 shows a detailed illustration of a keyboard 116, which may be used in connection with the present invention.

As can be seen, the keyboard 116 is a standard QWERTY keyboard having character keys including letter keys 204, number keys 208 and symbol keys 212. As is known, typing a particular character includes pressing or striking a particular key, referred to herein as a keystroke. In response to a keystroke, a particular character is rendered on the monitor 120. As used herein "rendering" refers to at least displaying a character on the monitor 120, and may additionally include storing or saving the character in a buffer, document and/or file. The standard QWERTY keyboard may be used in the familiar way to render Latin letters and Arabic numerals or, in accordance with embodiments of the present invention, to render Ethiopic characters. A character (Ethiopic or other) is rendered on the monitor 120 based on a mapping between the key that was pressed or struck and the rendered character. This mapping may be preformed by referencing a table stored in memory 108 or data storage 124. In rendering the Latin letters or Arabic numbers, the rendered character corresponds to a character printed on the struck key. In rendering an Ethiopic character, the rendered character does not correspond to a character printed on the struck key. It is also noted that for the QWERTY keyboard used in the conventional way, two characters may be mapped to the same key, wherein one of the characters is typed using the shift key. This is the case with the number keys 208 and the symbol keys 212, which include a "shifted" character and a "non-shifted" character. Moreover, the shifted characters associated with letter keys 204 correspond to the capital or upper case letters. As is known, rendering a shifted character includes pressing the key while holding down the shift key.

Referring again to FIG. 1, a computational device may also include data storage 124 for the storage of application programming modules and/or data. For example, operating system software 128 may be stored in the data storage 124. An example of a module that may be stored in data storage 124, is a character rendering module 132. As can be appreciated by one of skill in the art, a character rendering module 132 may comprise instructions for receiving user input and, in response, displaying user output. More particularly, the character rendering module 132 may be operable to receive keystroke input from the keyboard 116 and, in response, render a corresponding character on the monitor 120. A character rendering module 132 in accordance with embodiments of the present invention is operable to map the keystrokes received from a standard QWERTY keyboard 116 to a complete set of phonetic characters. In this regard, the character rendering module 132 may be used in connection with a phonetic language, such as Ethiopic, having a number of characters greatly exceeding the number of keys which are present on a standard QWERTY keyboard 116.

The character rendering module 132 achieves the mapping between QWERTY keyboard 116 input and a complete phonetic character set, in part, by measuring the timing between keystrokes. In this regard, the character rendering module 132 may be provided in association with a timing module 136. The timing module 136 may include a counter that is enabled when the data from the first keystroke is latched, and disabled when the data from the second keystroke is latched. The counter may be correlated or otherwise calibrated to a system clock or other real-time element to enable the timing between keystrokes to be measured in real-time units such as, seconds or milliseconds. The measurement of time between first and second keystrokes is used to determine if two successive keystrokes occur within a predetermined time interval. If so, the two keystrokes may be considered by the character rendering module 136 to be a combined keystroke. As used herein, a combined keystroke refers to a first and second keystroke that are grouped together for the purpose of typing a particular phonetic character. If not, the two keystrokes are considered to be two independent keystrokes that are unrelated to each other. In accordance with embodiments of the present invention, the predetermined interval may be adjusted by a user or an administrator.

Whether or not two successive keystrokes that occur within the predetermined time interval are considered to be a combined keystroke can also depend upon whether the first and second keystroke are one of a number of predetermined keystroke pairs. In this regard, the character rendering module 132 may be additionally provided in association with a correlation module 140, which is operable to determine if the first keystroke and the second keystroke are one of a number of predetermined keystroke pairs. Typically, a particular key will be paired to a number of other keys. The number of keys to which a particular key is paired will typically be less than the total number of keys on the keyboard. For example, as is the case with an embodiment of the invention described below, a particular key may paired with the vowel keys, the number keys and most of the symbol keys, and not paired with the remaining keys (i.e. the consonant keys, the number pad keys and the remaining symbol keys).

In operation, the correlation module 140 will assert a signal of affirmative correlation if both the first and second keystroke occur within a predetermined time interval and the first and second keystroke are one of a number of predetermined key pairs. If both of these conditions do not occur the correlation module 140 will assert a signal of non-affirmative correlation. More particularly, if the first and second keystroke do not occur within a predetermined time interval or the first and second keystroke are not one of a number of predetermined keystroke pairs, the correlation module 140 will assert a signal of non-affirmative correlation. A signal of affirmative correlation indicates, to the character rendering module 132, that the first and second keystrokes are to be considered a combined keystroke. Similarly, a signal of non-affirmative correlation indicates, to the character rendering module 132, that the first and second keystrokes are to be considered two independent keystrokes, which are unrelated to each other. It should be appreciated that the character rendering module 132, the timing module 136 and the correlation module 140 may be implemented as discrete elements or implemented together as elements of a combined software application.

By considering two successive keystrokes to be a combined keystroke, the second keystroke is considered to be a modifier or order specifier of the first key. This arrangement is particularly advantageous in mapping from a QWERTY keyboard 116 input to Ethiopic characters, which include groupings of characters that are related phonetically. In particular, speech sounds such as "ka", "ku", "ke", etc., which have a common consonant and a differing vowel, are represented in Ethiopic with a group of characters having a similar appearance. Each character within a group (or series) is said to belong to a particular character order. Rendering particular orders within the group requires a combined keystroke, such as, for example, "k" followed by a second keystroke that occurs within a predetermined time interval and is paired to the "k" key. As mentioned above, the vowel keys are typically paired to each key. Accordingly, if "a", "e", "i", "o" or "u" is received as the second keystroke within the predetermined time interval after the "k" first keystroke is received, a combined keystroke will result. Depending on which vowel key is received as the second keystroke, a particular Ethiopic character belonging to a particular order will be rendered. As the Ethiopic characters are themselves naturally grouped as vowel expansions, pairing keys to the vowel keys provides an advantageous and intuitive mapping for at least those who are familiar with both the Ethiopic and Latin characters. However, the number of possible vowel sounds exceeds the number the vowel keys present on the QWERTY keyboard. For example, the "ä" vowel sound is not represented on the QWERTY keyboard. As a result, embodiments of the present invention may use particular symbol keys to represent additional vowel sounds. In particular, a "/" second keystroke that follows an "k" first keystroke within the predetermined time interval can be used to produce a combined keystroke, which will result in the rendering of a particular Ethiopic character of a particular order.

Figure 3:
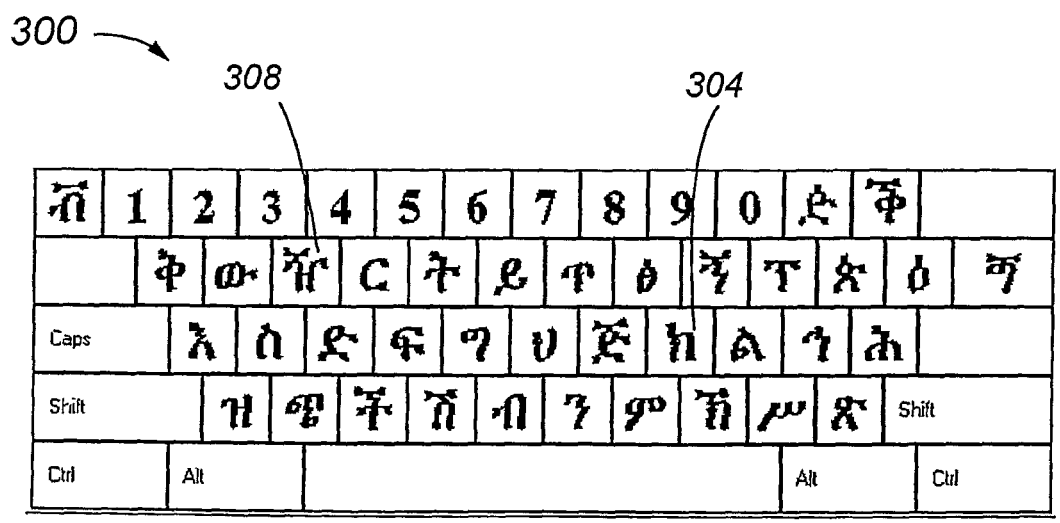
FIG. 3 is a default key assignment for Ethiopic characters on a standard keyboard, in accordance with embodiments of the present invention.

In accordance with embodiments of the present invention, one order (the sixth order) is designated as the default order. Displaying the default order within the character group requires only a first keystroke, such as, for example, "m". The default key assignment is shown in FIG. 3, with default Ethiopic characters overlaid on a standard keyboard. The default key assignment is determined based on the frequency of the characters as used in the Amharic language. The default key assignment 300 shown in FIG. 3 is thought to be an intuitive layout for a skilled Ethiopian typist, who will typically be familiar with similar key assignments. In particular, a skilled Ethiopian typist can be expected to reliably use a standard QWERTY keyboard having Latin letters to effectively type text in Ethiopic, provided that the key assignment like the one shown in FIG. 3 is maintained. It should be understood that the number of Ethiopic characters that can be typed or displayed using only the default keys of the present invention is limited and does not include the complete set of Ethiopic characters. The present invention uses computer technology to expand the capacity of a typist to include the ability to type the complete set of Ethiopic characters. The complete set of Ethiopic characters includes each complete vowel expansion as well as other characters.

In accordance with embodiments of the present invention, a "timing disable" key may be designated. When received within the predetermined time interval after a first keystroke, the timing disable key indicates that the default character associated with first keystroke should be displayed. In this way, a user can type at a comfortable speed without having to wait for the predetermined time interval to expire before typing the next character. A symbol key is typically designated as the timing disable key. When used to disable the timing mechanism, the symbol that is normally associated with the key is, of course, not displayed. In particular, a first keystroke is initially typed, followed by the timing disable key, typed within the predetermined time interval. As a result, the default character associated with the first keystroke is only displayed (and not the symbol normally associated with timing disable key). Thereafter, the user is free to continue typing without having to wait for the predetermined timing interval to expire.

FIGS. 4-8 show key assignments and ordered key pair assignments in accordance with embodiments of the present invention. The ordered key pair assignments operate as a mapping between QWERTY keyboard 116 input and corresponding characters to be rendered. As mentioned above, ordered keystroke pairs are used by the correlation module 140 to determine if a first and second keystroke are to be considered a combined keystroke. Accordingly, the keystroke pairs in FIGS. 4-8 reference a particular Ethiopic character that is rendered in response to the combined keystroke that includes the keystroke pair. The keys that are pressed or struck as the first and second keystrokes are referenced, in FIGS. 4-8, with the non-shifted symbols that appear on the keys in a QWERTY keyboard 116.

Figure 4:
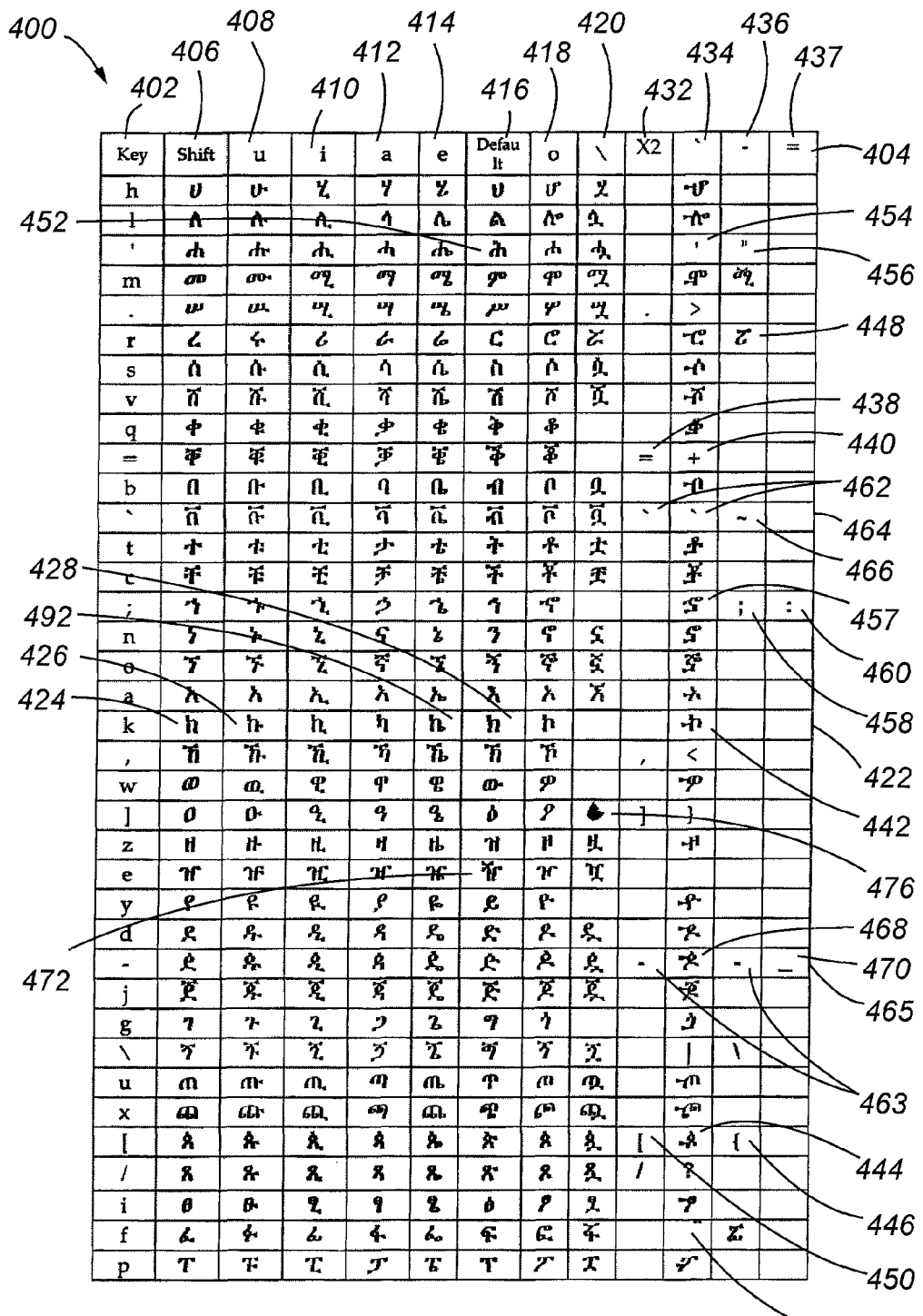
FIG. 4 is an illustration of keystroke pairs, in accordance with embodiments of the present invention.

Referring initially to FIG. 4, key pairs, which include characters of the Amharic alphabet are generally identified by reference numeral 400. Typically, the first keystroke of a given keystroke pair is shown in the left-most column, which is identified by the conventional symbol on the key and is generally associated with reference numeral 402. Typically, the second keystroke (or order specifier keystroke) of a given keystroke pair is shown in the top-most row and is generally identified with reference numeral 404. The top-most row 404 includes a number of keystroke indicators, beneath which are columns containing orders of Ethiopic characters. In particular, column 406 (beneath the "shift" second keystroke) includes the first order and unlike the other identified pairs, is selected by pressing the shift key when the first key 402 is struck. Column 408 (beneath the "u" second keystroke) includes the second order. Column 410 (beneath the "i" second keystroke) includes the third order. Column 412 (beneath the "a" second keystroke) includes the fourth order. Column 414 (beneath the "e" second keystroke) includes the fifth order. The top-most row 404 additionally provides a default key indicator, beneath which is a default character column 416. The default character column 416 includes the sixth order. The characters listed in the default (or sixth) character column 416 are displayed if a first keystroke is received which is not correlated with a second key press within the predetermined time interval or if a first keystroke is followed by the timing disable key, as described above. Column 418 (beneath the "o" second keystroke) includes the seventh order. Column 420 (beneath the "\" second keystroke) includes the eighth order.

Beginning with the row beneath the top-most row 404, each row includes a group of related Ethiopic characters. For example, consider the row beginning with "k", which is generally identified by reference numeral 422. Row 422 includes an ordered expansion of related Ethiopic characters. In typing the first order characters, the shift key is held down while a key 402 in the left-most column is struck. For example, the first order character "KE" (as is cult) 424 may be rendered on the monitor if the "shift" key is held down, while the "k" key is struck. This is in contrast to the remaining orders of characters, which are typed by striking a first key from the left-most column 404 and a second key from the top-most row 408 within a predetermined time interval. For example, the second order character "KU" (as in cook) 426 will be rendered if a combined keystroke having "k" as the first keystroke and "u" as the second keystroke, is received within the predetermined time interval. The remaining orders may be displayed in a similar manner, noting however that the group of characters in row 422 does not include an eighth order character. Additionally, it is noted that the default character 428 "K" (as in cake) may be rendered if only "k" is received as the first keystroke. Alternatively, the default character may be rendered by the use of the timing disable key, as described above.

As shown in FIG. 4, a particular first keystroke may be paired with a number of other second keystrokes that are not associated with an ordered expansion of characters. In this regard, FIG. 4 includes columns 432, 434, 436 and 437 that are located, respectively, beneath the "X2", "", "-" and "=" second keystrokes shown in row 404. The "X2" second keystroke (which is shown in the top-most row 404 and begins column 434) refers to the situation in which the key pressed as the first keystroke is pressed again as the second keystroke. Accordingly, in certain cases this "double-strike" combination of first and second keystrokes is considered a combined keystroke. As mentioned above, the standard QWERTY keyboard includes symbol keys 212. Some symbol keys 212 have two symbols (not letters and not numbers) per key, such as the key used to type the ";" character and the ":" character. Conventionally, the first symbol is typed with the symbol key, and the second symbol is typed using the symbol and the shift key. The symbol keys 212 on a QWERTY keyboard having two symbols (not letters and not numbers) are herein referred to as two-symbol symbol keys. In accordance with embodiments of the present invention, the double-strike combined keystroke may be used to preserve the standard functionality of the two-symbol symbol keys. In particular, as the two-symbol symbol keys on the standard QWERTY keyboard are assigned to Ethiopic characters, an arrangement or mapping is needed to allow a user to be able to type the standard symbols, if needed. Accordingly, in some cases, a user may type the two-symbol symbol key twice within a predetermined time interval to affect the typing of a particular symbol. For example, the mapping shown in FIG. 4 includes a "=" symbol character, which is identified by the reference numeral 438. The "=" symbol character 438 is typed by a combined keystroke, which includes a "=" first keystroke and a "=" second keystroke entered within the predetermined period after the first keystroke. Additionally, preserving the ability to type the symbols associated with two-symbol symbol keys in the present invention includes an arrangement or mapping for the second or shifted symbol. In that regard, the "" second keystroke (which is shown in the top-most row 404, and which begins column 434) may operate as a "shift" key. In particular, a user may type the shifted symbol with a combined keystroke, which includes the two-symbol symbol key as the first keystroke and the "" key as the second keystroke. For example, the ordered classic expansion key pair assignments shown in FIG. 4 include a "+" symbol character, which is identified by the reference numeral 440. The "+" symbol character 440 is typed by a combined keystroke, which includes a "=" first keystroke and a "" second keystroke.

In addition to functioning as a "shift" key, the "" second keystroke may also be used to display miscellaneous Ethiopic characters, which are not considered to be members of an ordered expansion of characters. For example, the character identified with reference numeral 442, shown in row 422, does not belong to an ordered expansion of characters. This character is displayed as a result of receiving a combined keystroke having a "k" first keystroke and a "" second keystroke. As can be seen, the character identified with reference numeral 442 has a significantly different appearance from the other characters in row 422 and is not a member of the ordered classic expansion.

It is noted that the "" key takes on two functions: first, as a second keystroke "shift" key for typing symbols; and second, as a second keystroke in typing miscellaneous Ethiopic characters. These two roles do not conflict if the first keystroke used to type the miscellaneous Ethiopic character is a letter key. (See, for example, the above description of the character identified with reference numeral 442). However, when the first keystroke used to type the miscellaneous Ethiopic character is a two-symbol symbol key, the two roles for the "" key cannot be maintained. For example, consider the character identified with reference numeral 444. This character is displayed as a result of receiving a combined keystroke having a "[" first keystroke and a "" second keystroke. As a result, the combined keystroke having a "[" first keystroke and a "" second keystroke is not available for typing the shifted symbol "{". Accordingly, an alternative key assignment is needed for the shifted symbol. In that regard, the "-" key may be used as a second keystroke (which is shown in the top-most row 404, and which begins column 436) and may operate as an alternative "shift" key. In particular, a user may type a shifted symbol with a combined keystroke, which includes the two-symbol symbol key as the first keystroke and the "-" key as the second keystroke. Continuing with the above example, the ordered key pair assignments shown in FIG. 4 include a "{" symbol character, which is identified by the reference numeral 446. The "{" symbol character 446 is typed by a combined keystroke, which includes a "[" first keystroke and a "-" second keystroke. It is additionally noted that the "-" second keystroke may also be used to type miscellaneous Ethiopic characters that are not associated with an ordered expansion of characters. For example, the character identified by the reference numeral 448 is typed using a combined character having an "r" first keystroke and an "-" second keystroke.

The assignments of the symbols associated with the two-symbol symbol key in accordance with embodiments of the present invention can be understood as a case-by-case application of a set of priorities. The first priority corresponds to the double-strike combined keystroke (column 432). The second priority corresponds to the """ key (column 434). The third priority corresponds to the "-" key (column 436). As described below, a fourth priority corresponding to the "=" key (column 437), may be needed. In assigning the symbols of a particular two-symbol symbol key, the highest available priority is given to the non-shifted symbol and the next highest available priority is given to the shifted symbol key. This symbol assignment scheme is described above in connection with two examples. In the case of the "=" (438) and "+" (440) symbols, the double-strike key (column 432) and the """ key (column 434) are available. Accordingly, the "=" symbol is assigned to the double-strike second keystroke, and the "+" is assigned to the """ second keystroke. In the case of the "[" (450) and "{" (446) symbols, the double-strike key (column 432) is available, but the """ key (column 434) is not available. Accordingly, the "[" symbol is assigned to the double-strike second keystroke, and the "{" is assigned to the "-" second keystroke. A number of other examples of the case-by-case application of the above priorities are given below.

In accordance with embodiment of the present invention, the """ symbol key is designated as the timing disable key, the operation of which is described above. Accordingly, a double-strike combined keystroke having a """ first keystroke and """ second keystroke is not available for typing the """ character. In particular, a combined keystroke having a """ first keystroke and """ second keystroke designates the default character assigned to the """ key. In FIG. 4 this character is identified with the 452 reference numeral. Following the priority rules, the """ symbol (identified with reference number 454) is assigned to the """ second keystroke (column 434) and the """" symbol (identified with reference number 456) is assigned to the "-" second keystroke (column 436).

Figures 5, 6:
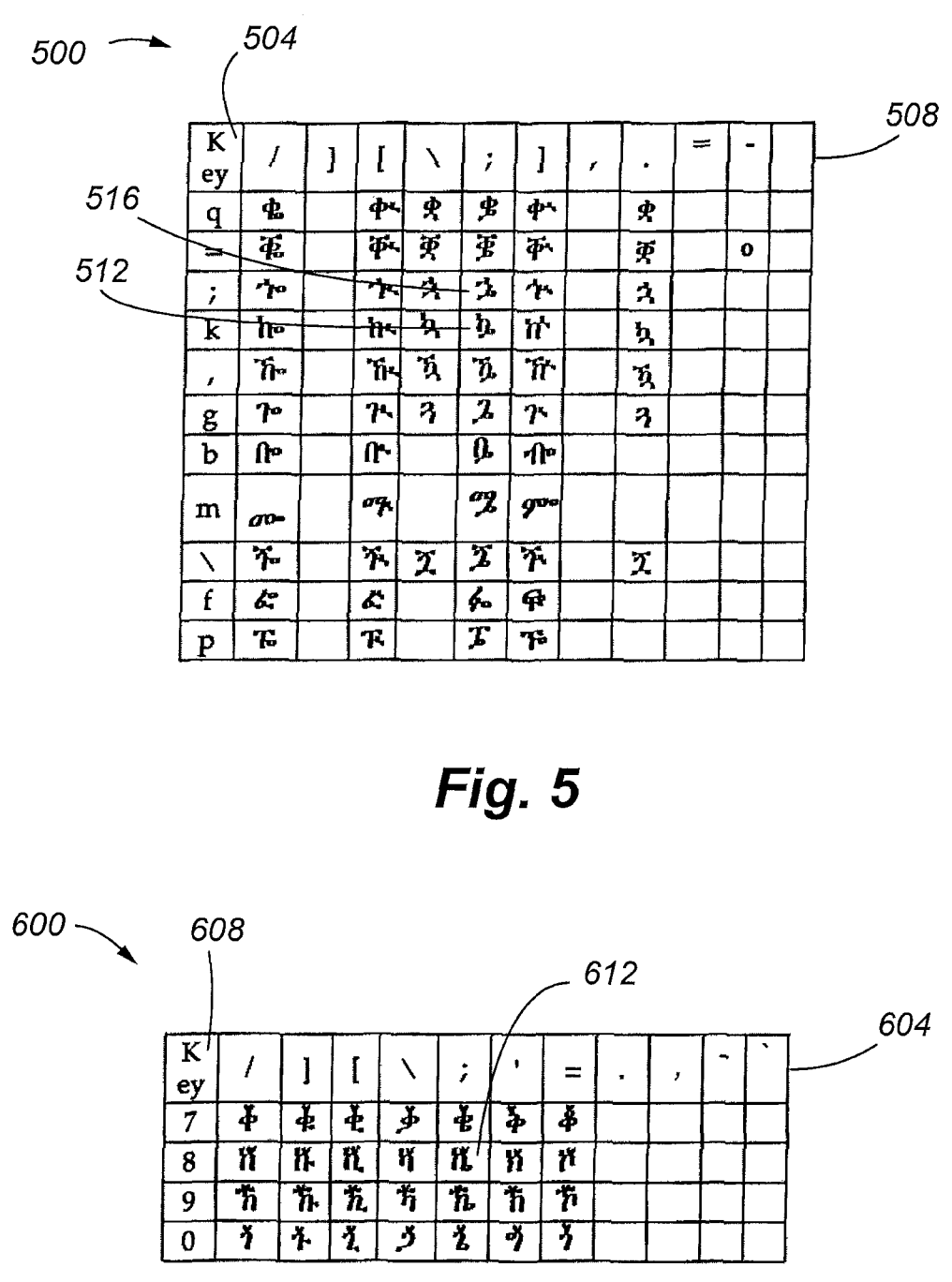

As set forth in FIG. 5, a combined keystroke having a ";" first keystroke and a ";" second keystroke is assigned to a particular Ethiopic character. Accordingly, a double-strike combined keystroke having a ";" first keystroke and ";" second keystroke is not available for typing the ";" character. Additionally, the combined keystroke having a ";" first keystroke and a """ second keystroke is assigned to a particular Ethiopic character (identified by reference number 457). Following the priority rules, the ";" symbol (identified with reference number 458) is assigned to the "-" second keystroke (column 436) and the ":" symbol (identified with reference number 460) is assigned to the "=" second keystroke (column 437).

As a final example of the case-by-case application of the prioritized symbol key assignments, consider the symbols that are associated with the two "shift" keys themselves. In these cases, the three combined keystrokes available for symbol key assignment appear as two possible combined keystrokes because a double-strike combined keystroke is not distinct from one of the other combined keystrokes. Accordingly, the """ symbol (identified by reference number 462 appears twice in row 464, and the "-" symbol (identified by reference number 463) appears twice in row 465. Following the priority rules, the "~" symbol (identified by reference number 466) is assigned to the "-" second keystroke. As the combined keystroke having a "-" first keystroke and a """ second keystroke is assigned to particular Ethiopic character (identified by reference number 468), this combined keystroke is unavailable for assignment of the "_" symbol. As a result, the "_" symbol (identified with reference number 470) is assigned to the combined keystroke having a "-" first keystroke and a "=" second keystroke.

FIG. 4 additionally includes a stress mark generally indicated by reference numeral 474 and typed with a combined keystroke having a "f" first keystroke and a """ second keystroke. Character 474 is a ligature mark consisting of two dots that appear above the character to be stressed. The Ethiopic system is syllabic and thus every character has the potential to be stressed. However, the two dot stress symbol 474 currently in use is borrowed from western scripts and is problematic when used in connection with Ethiopic. In particular, the two dots may potentially go on top of every character and some of the characters are too big to accommodate dots. Accordingly, Dr. Aberra Molla has proposed an alternative Ethiopic stress mark, which is very close to the shape of an apostrophe and is typed after an Ethiopic character to be stressed. In accordance with embodiments of the present invention, the apostrophe stress mark may be used instead of the two dot ligature mark. FIG. 4 additionally includes an optional glyph generally identified by reference numeral 476, which is reserved for logos, signatures and the like. This character is typed with the combined keystroke having a "]" first keystroke and a "\" second keystroke.

Turning now to FIG. 5, additional ordered key pairs, in accordance with embodiments of the present invention, are generally identified with reference numeral 500. The characters typed using ordered key pairs 500 are the characters of the Amharic, Tigrigna, Tigre and Guragie alphabets. Similar to FIG. 4, FIG. 5 includes a left-most column 504 indicating a first keystroke, and a top-most row 508 indicating a second keystroke. In accordance with embodiments of the present invention, all of these characters of the Ethiopic alphabet are typed using combined keystrokes. For example, the character identified with reference numeral 512 is typed using a combined keystroke, which includes a "k" first keystroke and a ";" second keystroke. As noted above, FIG. 5 includes a character, identified by reference numeral 516, which is typed using a combined keystroke having a ";" first keystroke and a ";" second keystroke.

Turning now to FIG. 6, additional ordered key pairs, in accordance with embodiments of the present invention, are generally identified with reference numeral 600. The characters, which are typed using ordered key pairs 600, belong to the Guragie alphabet. In contrast to FIGS. 4 and 5, the first keystroke is shown in the top-most row 604, and the second keystroke is shown in the left-most column 608. In accordance with embodiments of the present invention, all of these characters of the Ethiopic alphabet are typed using combined keystrokes. For example, the character identified with reference numeral 612 is typed using a combined keystroke, which includes a ";" first keystroke and a "8" second keystroke.

Figure 7:
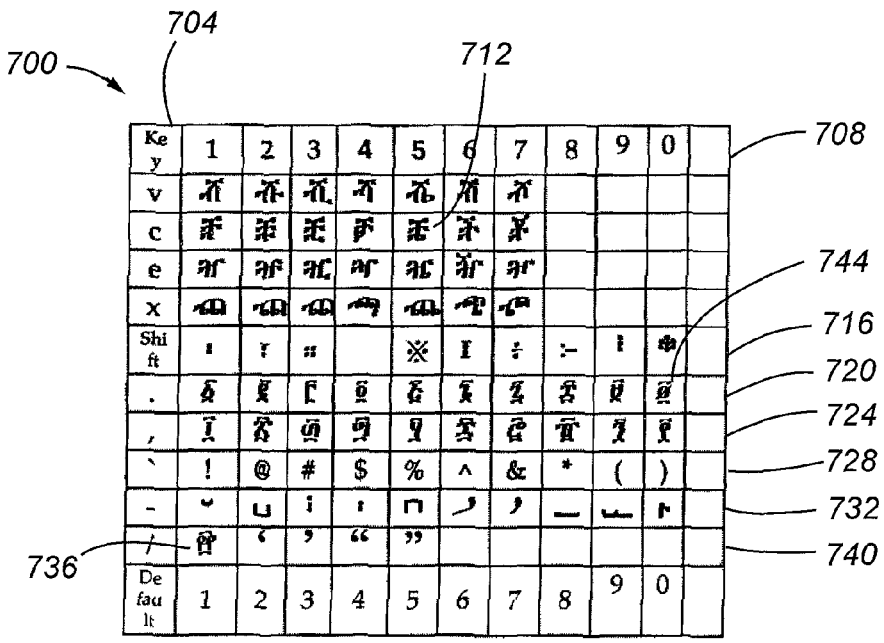
FIG. 7 is another illustration of keystroke pairs, in accordance with embodiments of the present invention.

Turning now to FIG. 7, additional ordered key pairs, in accordance with embodiments of the present invention, are generally identified with reference numeral 700. The characters typed using ordered key pairs 700 include other characters of the Guragie alphabet. Additionally, the characters typed using the ordered key pairs 700 includes character of classic Ethiopic or Ge'ez. Similar to FIG. 4, FIG. 7 includes a left-most column 704 indicating a first keystroke, and a top-most row 708 indicating a second key stoke. In accordance with embodiments of the present invention, all of these Ethiopic characters are typed using combined keystrokes. For example, the character identified with reference numeral 712 is typed using a combined keystroke, which includes a "c" first keystroke and a "5" second keystroke. The characters in row 716 are Ethiopic symbols. The characters in row 720 are Ethiopic digits. The characters in row 724 are Ethiopic numerals 10-100. The characters in row 728 are ASCII symbols, which in accordance with embodiments of the present invention are typed using a combined keystroke. The characters in row 732 are Ethiopic music symbols. The character 736 in row 740 is the Ethiopic numeral 10,000. The remaining characters in row 740 are quotation marks. The character 744 is an Ethiopic numeral zero, which was introduced by Dr. Aberra Molla in the late 80's. (Previously, Ethiopic lacked a character representing zero.)

Figure 8:
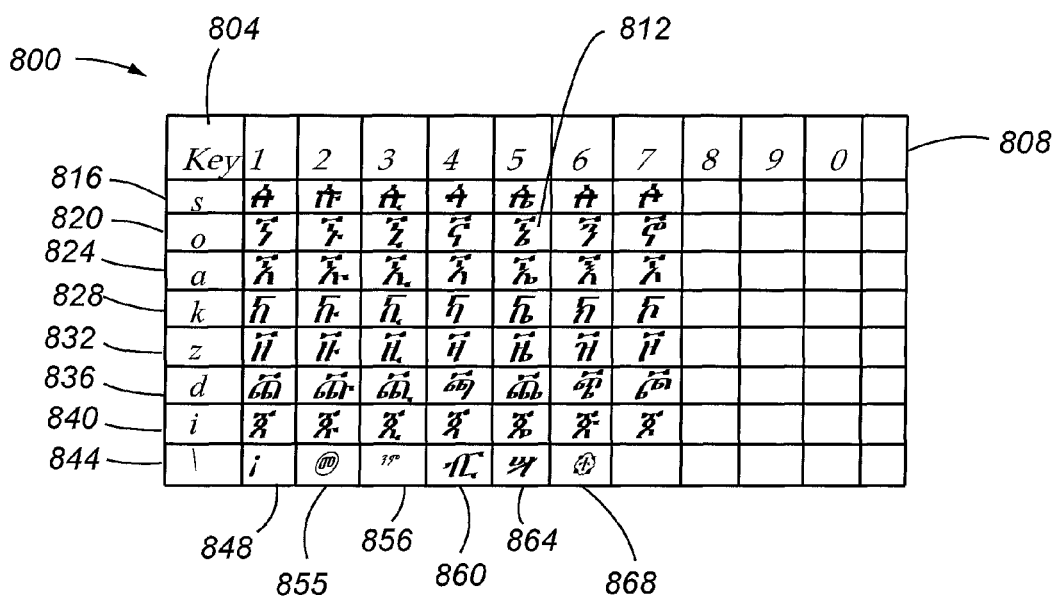
FIG. 8 is another illustration of keystroke pairs, in accordance with embodiments of the present invention.

Turning now to FIG. 8, additional ordered key pairs, in accordance with embodiments of the present invention, are generally identified with reference numeral 800. The characters typed using ordered key pairs 800 include characters of the less-widely used alphabets. Additionally, the characters typed using ordered key pairs 800 include a number of new glyphs that have not yet been accepted and coded in Unicode (discussed below). Similar to FIG. 4, FIG. 8 includes a left-most column 804 indicating a first keystroke and a top-most row 808, indicating a second keystroke. In accordance with embodiments of the present invention, all of these Ethiopic characters are typed using combined keystrokes. For example, the character identified with reference numeral 812 is typed using a combined keystroke, which includes a "o" first keystroke and a "5" second keystroke. The characters in row 824 belong to the Agew/Bilen alphabet. The characters in rows 816, 820, and 832 belong to Gamo-Gofa/Dawro while 828, 838 and 840 are Gumuz alphabets. The Geez characters have not been exhaustively presented and some variants and obsolete versions have also not been included here. An example is the Gamo-Gofa/Dawro "D" class that can be typed with a key and the numbers one to eight though not shown in FIG. 8. Other examples are the Saho additions. Modern Geez has adopted the Arabic numerals, and Dr. Molla has included more Latin symbols to the set, particularly those on the computer keyboard. It should be noted that an Amharic keyboard reduced by removing some redundant classes (to Small Amharic or Amharic S) may not have to be encumbered by rendering the complete Amharic or Ethiopic configurations and typing will thus be simpler in languages with less glyphs as there are options of not using all characters in varieties or languages where they are not needed. In such cases unnecessary rendering will be reverted optionally by loading specific keyboard (at start up or through menus) to less keyboarding methods in the reverse orders of the priorities. The character identified with reference number 848 (in row 844) is an Ethiopian sarcasm mark. The remaining characters are new additions to the Ethiopic character set introduced by Dr. Aberra Molla some years ago. The character identified with reference number 855 is an Ethiopian copyright symbol. The character identified with reference number 856 is an Ethiopian trademark symbol. The character identified with reference number 860 is an Ethiopian dollar (Birr) symbol. The character identified with reference number 864 is an Ethiopian penny (Santim) symbol. The character identified with reference number 868 is an Ethiopian registration mark.

Furthermore, the set continues to grow and the system can accommodate more characters in various methods. Examples are the use of empty typing spots in FIG. 4 with or without shifting the typing method in accordance with the rules of priorities. For instance, if the existence of characters exemplified by the ninth Ethiopic "v" character is to be verified and standardized, it would be typed by double striking the """ while """ would be typed with the key and "-" as a second key whereas "-" and "+" would type "~". Other examples of characters that when standardized could share similar characteristics are the ninth forms typed with "]", """, ";", ".", "f" and "=" and "/". More examples of new eighth additions to Gamo-Gofa/Dawro are like those that could be typed with "s", "z"; Ethiopic typed with "a", "]", "w" and the Feedel "y'. Stress and stretch marks and a dot ligature positioned below or ahead of characters could be typed from within row 740 and a new glyph for number 1,000 and a couple of ligatures marks could also fit.

Figure 9:
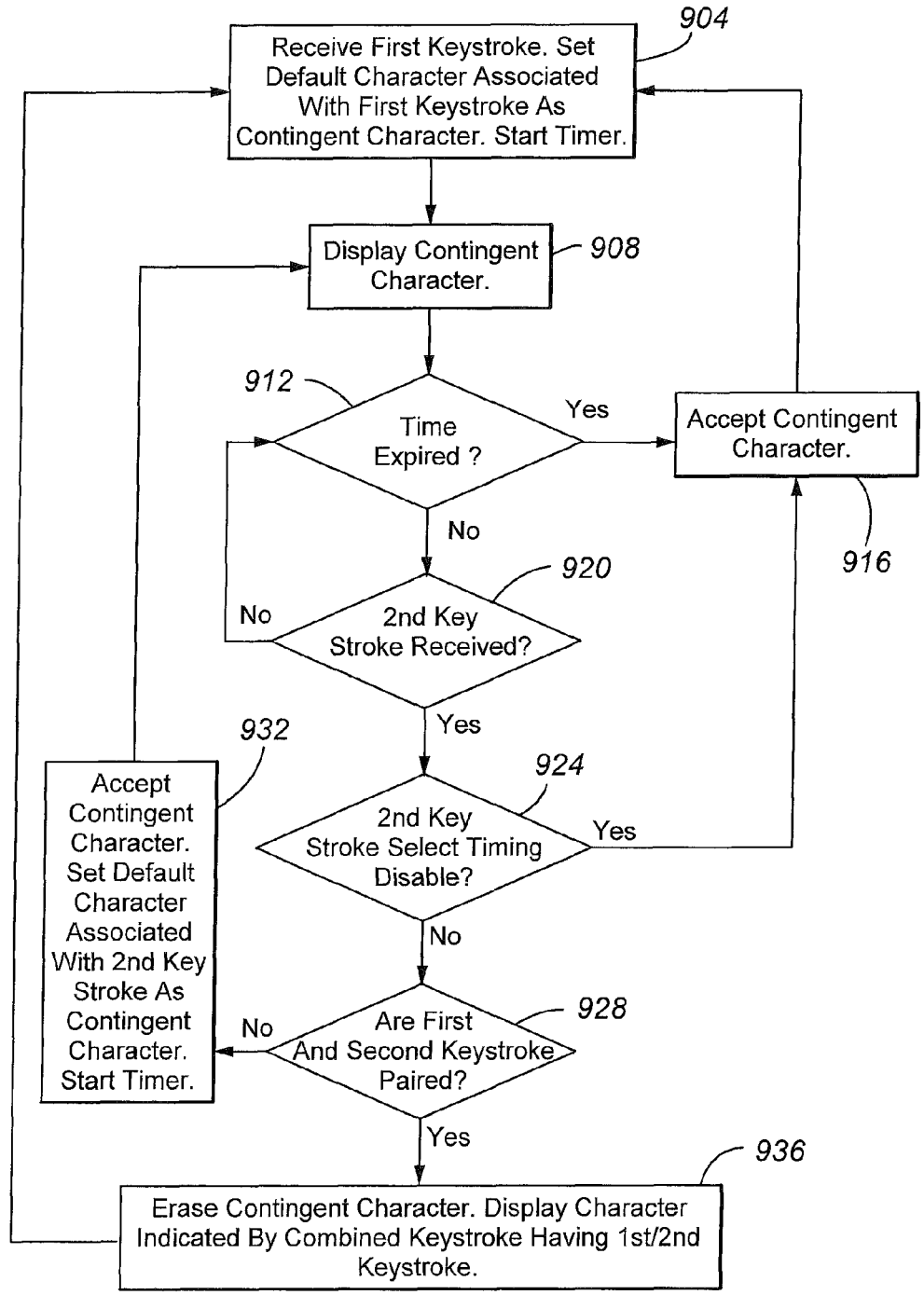
FIG. 9 is a flow chart of a method of entering Ethiopic characters, in accordance with embodiments of the present invention.
Figure 10A:
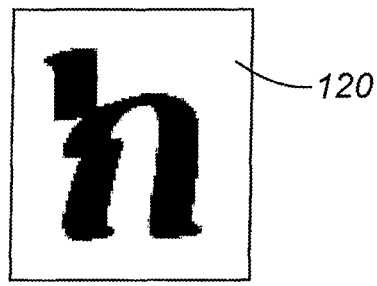
FIGS. 10A-10C are illustrations of text output, in accordance with embodiments of the present invention.

Aspects of a character entry system 100 entry system in accordance with embodiments of the present invention are illustrated in FIG. 9. At step 904, a first keystroke entered by a user through the keyboard 116 is received by the character rendering module 132. A default character associated with the first keystroke is then set or designated as a contingent character. As used herein, a "contingent character" is one that is initially rendered and may later be accepted or removed depending on subsequent events. In designating and rendering a contingent character, the character is chosen according to a predetermined default key assignment. A default key assignment 300, in accordance with embodiments of the present invention, is shown in FIG. 3, overlain on a standard keyboard. The keyboard overlay is shown herein by way of illustration, and is not meant to imply that the Ethiopic character will appear or need to appear on the keyboard 116 employed by a user. In fact, the keyboard employed by a user may be the standard QWERTY keyboard 116, which is shown in FIG. 2 for reference. Additionally, at step 904, a timer is started by the timing module 136, concurrently, as the first keystroke is latched. At step 908, the contingent character is rendered or displayed on the monitor 120. For example, at step 904, if a user strikes the key 216, shown in FIG. 2 ("k" on the QWERTY keyboard), the character rendering module will render the character 428, shown in FIG. 4. FIG. 10A illustrates the text output on the monitor 120 as it would appear following step 908.

Referring again to FIG. 9, after the first keystroke is received (step 904) and the corresponding character is rendered (step 908), a determination is made whether the timer has expired (step 912). If the timer has expired, step 916 follows. At step 916, the contingent character is accepted. After step 916, step 904 may follow, allowing the next character to be entered. If the timer has not expired, step 920 follows. At step 920, a determination is made whether a second keystroke has been received from the user. If a second keystroke has been received, it occurred within the predetermined time period. In that regard, step 924 may follow. If, at step 920, a second keystroke has been received, step 912 may follow, wherein a determination is again made whether the timer has expired.

At step 924, a second keystroke has been received by the character rendering module 132. At this point, a determination is made as to whether the second keystroke is the timing disable key. If the second keystroke is the timing disable key, no character is rendered and the previously rendered contingent character is accepted (step 916). Accordingly, the text output on the monitor continues to appear as shown in FIG. 10A. If, at step 924, the second keystroke is not the timing disable key, step 928 follows.

Figure 10B:
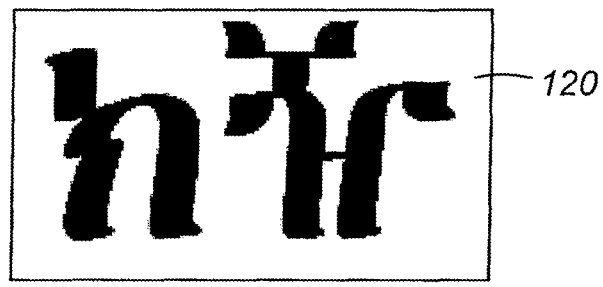

At step 928, a determination is made, by the correlation module 140, if the first and second keystrokes together are one of a number of predetermined ordered key pairs. Exemplary ordered key pairs which may be used in connection with the present invention are shown in FIGS. 4-8. If the first and second keystrokes together are not an ordered pair, step 932 follows. At step 932, the previously displayed contingent character is accepted and a default character associated with the second keystroke is set or designated as the contingent character. Additionally, at step 932, the timer is started again, as the second keystroke may potentially be modified by the next received keystroke. After step 932, step 908 follows, wherein the contingent character is rendered. For example, if a user strikes the key 220, shown in FIG. 2 ("e" on the QWERTY keyboard), the character designated as the contingent character at step 932 is the default character 472 as specified in FIG. 4. FIG. 10B illustrates the text output on the monitor 120 as it would appear following step 908.

Figure 10C:
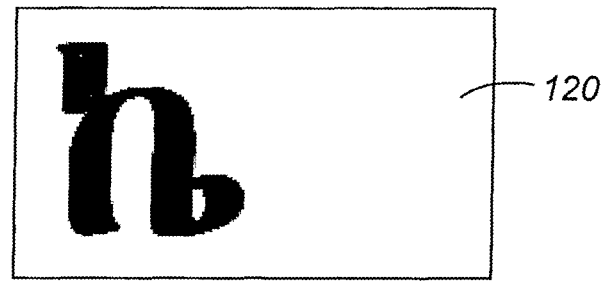

If the first and second keystrokes together are an ordered pair, step 936 follows. At step 936, a combined keystroke has been received, which corresponds to the first keystroke modified by the second keystroke. Accordingly, the previously rendered contingent character corresponding to the first keystroke is removed. Then the character corresponding to the received combined keystroke is displayed. Continuing with the example above, say that a user strikes the "e" key on the QWERTY keyboard as the second keystroke, the previous character will be erased from the monitor and the character identified by reference numeral 492 (in FIG. 4) will be rendered on the monitor 120. FIG. 10C illustrates the text output on the monitor 120 as it would appear following step 936. Accordingly to the example, entry of a "k" followed by a "e" as the second keystroke. After step 936, step 904 may follow, allowing the selection of another character to be received.

Referring again to FIG. 1, the character rendering module 132 may be provided in association with a font library, such as a Unicode library 144. Unicode is a character encoding standard, which includes encoding of the many of the world's languages. Unicode provides a unique numerical code point for each character. The Unicode code points are divided into 17 planes, each having 65,536 ($2^{16}$) code points. Most characters are assigned to the Plane 0 (0000-FFFF) or the Basic Multilingual Plane (BMP). Other planes include Plane 1 (10000-1FFFF) or the Supplementary Multilingual Plane (SMP), and Plane 2 (20000-2FFFF) or the Supplementary Ideographic Plane (SIP). Characters are grouped together in blocks having a number of code points typically totaling some multiple of eight.

As of this writing Unicode 5.0 is the most recently promulgated standard. In Unicode 5.0, Ethiopic has been assigned three blocks in the BMP. These blocks are as follows: Ethiopic (1200-137F), Ethiopic Supplement (1380-139F) and Ethiopic Extended (2D80-2DDF). The current encoding of Ethiopic characters is not expected to change in subsequent reversions of the Unicode standard. However, it is to be noted that Ethiopic characters typed with Unicode may be expanded in later versions. As of this writing, the characters shown in FIG. 4-7 have been encoded in Unicode except for a few such as the glyphs typed with "h" and "\" and "T" and "\". The characters shown in FIG. 8 await encoding and there are some more that have not yet been publicized.

In rendering a character, the character rendering module 132 may reference the Unicode library 144. In referencing the Unicode library 144, the character rendering module 132 may include a reference to a specific code point. In accordance with embodiments of the present invention, Table 1, appended hereto, provides the Unicode code points referenced in rendering the characters shown FIGS. 4-7. For those table entries having one character, Table 1 provides the code points referenced in rendering the default characters. As mentioned above, the default characters are rendered in response to a first keystroke. Accordingly, for those table entries having one character, Table 1 includes a first keystroke (identified by its symbol on a QWERTY keyboard) and an associated Unicode code point. For those table entries having two characters, Table 1 provides the code points referenced in rendering the characters associated with a combined keystroke. As mentioned above, a combined keystroke includes a first and second keystroke. Accordingly, for those table entries having two characters, Table 1 includes first and second keystroke (shown in order and identified by their symbol on a QWERTY key board) and an associated Unicode code point. Note that the Unicode code points are given in decimal form in Tables 1.

It is noted that future revisions to Unicode may include corrections of errors. An error of which Dr. Aberra Molla is aware of is the coding of the character 448 (FIG. 4) ahead of the character typed with "m" and "-". This is contrary to the Ethiopic sorting order. Accordingly, such corrections may require changing the code points in Table 1.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

TABLE 1

| Key(s) | Unicode code point |
|---|---|
| '- | 039 |
| -- | 045 |
| ' | 04629 |
| - | 04861 |
| -' | 04861 |
| '' | 04629 |
| ! | 04961 |
| " | 04624 |
| # | 04962 |
| $ | 032 |
| % | 04960 |
| & | 04965 |
| ( | 04967 |
| ) | 04968 |
| * | 04966 |
| , | 04797 |
| ,' | 04797 |
| ,, | 044 |
| ,, | 04803 |
| ,/ | 04800 |
| ,; | 04804 |
| ,[ | 04805 |
| ,\ | 04803 |
| ,] | 04802 |
| , | 060 |
| ,0 | 04987 |
| ,1 | 04978 |
| ,2 | 04979 |
| ,3 | 04980 |
| ,4 | 04981 |
| ,5 | 04982 |
| ,6 | 04983 |
| ,7 | 04984 |
| ,8 | 04985 |
| ,9 | 04986 |
| ,a | 04795 |
| ,e | 04796 |
| ,i | 04794 |
| ,o | 04798 |
| ,u | 04793 |
| . | 04645 |
| .' | 04645 |
| .. | 046 |
| .\ | 04647 |
| . | 062 |
| .1 | 04969 |
| .2 | 04970 |
| .3 | 04971 |
| .4 | 04972 |
| .5 | 04973 |
| .6 | 04974 |
| .7 | 04975 |
| .8 | 04976 |
| .9 | 04977 |
| .a | 04643 |
| .e | 04644 |
| .i | 04642 |
| .o | 04646 |
| .u | 04641 |
| / | 04925 |
| /' | 04925 |
| // | 047 |
| /\ | 04927 |
| / | 063 |
| /0 | 11736 |
| /1 | 04988 |
| /2 | 0145 |
| /3 | 0146 |
| /4 | 0147 |
| /5 | 0148 |

TABLE 1-continued

| Key(s) | Unicode code point |
|---|---|
| /7 | 11712 |
| /8 | 11720 |
| /9 | 11728 |
| /a | 04923 |
| /e | 04924 |
| /i | 04922 |
| /o | 04926 |
| /u | 04921 |
| : | 04736 |
| ; | 04741 |
| ;' | 04741 |
| ;- | 059 |
| ;. | 04747 |
| ;/ | 04744 |
| ;; | 04748 |
| ;[ | 04746 |
| ;\ | 04747 |
| ;] | 04749 |
| ; | 04743 |
| ;= | 058 |
| ;0 | 11740 |
| ;7 | 11716 |
| ;8 | 11724 |
| ;9 | 11732 |
| ;a | 04739 |
| ;e | 04740 |
| ;i | 04738 |
| ;o | 04742 |
| ;u | 04737 |
| ? | 04920 |
| @ | 04963 |
| [ | 04917 |
| [' | 04917 |
| [- | 0123 |
| [[ | 091 |
| [\ | 04919 |
| [ | 11665 |
| [0 | 11738 |
| [7 | 11714 |
| [8 | 11722 |
| [9 | 11730 |
| [a | 04915 |
| [e | 04916 |
| [i | 04914 |
| [o | 04918 |
| [u | 04913 |
| \ | 04631 |
| -\ | 04863 |
| \' | 04893 |
| \ | 04893 |
| \- | 092 |
| \. | 04895 |
| \/ | 11667 |
| \; | 11669 |
| \[ | 11668 |
| \\ | 04895 |
| \] | 11670 |
| \ | 0124 |
| \0 | 11739 |
| \7 | 11715 |
| \8 | 11723 |
| \9 | 11731 |
| \a | 04891 |
| \e | 04892 |
| \i | 04890 |
| \o | 04894 |
| \u | 04889 |
| ] | 04821 |
| ]' | 04821 |
| ]] | 093 |
| ] | 0125 |
| ]0 | 11737 |
| ]7 | 11713 |
| ]8 | 11721 |
| ]9 | 11729 |
| ]a | 04819 |
| ]e | 04820 |
| ]i | 04818 |

TABLE 1-continued

| Key(s) | Unicode code point |
|---|---|
| ]o | 04822 |
| ]u | 04817 |
| ¨ | 04964 |
| ¯ | 04856 |
| ¯,¨ | 034 |
| ` | 04717 |
| ` | 04717 |
| `, | 11661 |
| `,- | 0126 |
| `,[ | 11665 |
| `,\ | 04719 |
| `` | 096 |
| `0 | 041 |
| `1 | 033 |
| `2 | 064 |
| `3 | 035 |
| `4 | 036 |
| `5 | 037 |
| `6 | 094 |
| `7 | 038 |
| `8 | 042 |
| `9 | 040 |
| `a | 04715 |
| `e | 04716 |
| `i | 04714 |
| `o | 04718 |
| `u | 04713 |
| { | 04912 |
| \| | 04888 |
| } | 04816 |
| ~ | 04712 |
| + | 04688 |
| < | 04792 |
| = | 04693 |
| =' | 04693 |
| -= | 095 |
| =. | 04699 |
| =/ | 04696 |
| =; | 04700 |
| =[ | 04698 |
| =\ | 04699 |
| =] | 04701 |
| = | 043 |
| == | 061 |
| =0 | 11742 |
| =7 | 11718 |
| =8 | 11726 |
| =9 | 11734 |
| =a | 04691 |
| =e | 04692 |
| =i | 04690 |
| =o | 04694 |
| =u | 04689 |
| > | 04640 |
| 0 | 048 |
| -0 | 05017 |
| '0 | 11741 |
| 1 | 049 |
| -1 | 05008 |
| 2 | 050 |
| -2 | 05009 |
| -3 | 05010 |
| 3 | 051 |
| -4 | 05011 |
| 4 | 052 |
| -5 | 05012 |
| 5 | 053 |
| -6 | 05013 |
| 6 | 054 |
| -7 | 05014 |
| 7 | 055 |
| '7 | 11717 |
| 8 | 056 |
| '8 | 11725 |
| -8 | 05015 |
| -9 | 05016 |
| 9 | 057 |
| '9 | 11733 |
| A | 04768 |
| a | 04773 |
| a' | 04773 |
| -a | 04859 |
| 'a | 04627 |
| a\ | 04775 |
| a` | 11658 |
| aa | 04771 |
| ae | 04772 |
| ai | 04770 |
| ao | 04774 |
| au | 04769 |
| B | 04704 |
| b | 04709 |
| b' | 04709 |
| b/ | 04996 |
| b; | 04998 |
| b[ | 04997 |
| b\ | 04711 |
| b] | 04999 |
| b` | 11653 |
| ba | 04707 |
| be | 04708 |
| bi | 04706 |
| bo | 04710 |
| bu | 04705 |
| C | 04728 |
| c | 04733 |
| c' | 04733 |
| c\ | 04735 |
| c` | 11655 |
| c1 | 11688 |
| c2 | 11689 |
| c3 | 11690 |
| c4 | 11691 |
| c5 | 11692 |
| c6 | 11693 |
| c7 | 11694 |
| ca | 04731 |
| ce | 04732 |
| ci | 04730 |
| co | 04734 |
| cu | 04729 |
| D | 04848 |
| d | 04853 |
| d' | 04853 |
| d\ | 04855 |
| d` | 11660 |
| da | 04851 |
| de | 04852 |
| di | 04850 |
| do | 04854 |
| du | 04849 |
| 'e | 04628 |
| E | 04832 |
| e | 04837 |
| e' | 04837 |
| -e | 04860 |
| e\ | 04839 |
| e1 | 11696 |
| e2 | 11697 |
| e3 | 11698 |
| e4 | 11699 |
| e5 | 11700 |
| e6 | 11701 |
| e7 | 11702 |
| ea | 04835 |
| ee | 04836 |
| ei | 04834 |
| eo | 04838 |
| eu | 04833 |
| F | 04936 |
| f | 04941 |
| f' | 04941 |
| f- | 04954 |
| f/ | 05000 |
| f; | 05002 |
| f[ | 05001 |

TABLE 1-continued

| Key(s) | Unicode code point |
|---|---|
| f\ | 04943 |
| f] | 05003 |
| f` | 04959 |
| fa | 04939 |
| fe | 04940 |
| fi | 04938 |
| fo | 04942 |
| fu | 04937 |
| G | 04872 |
| g | 04877 |
| g' | 04877 |
| g. | 04883 |
| g/ | 04880 |
| g; | 04884 |
| g[ | 04882 |
| g\ | 04883 |
| g] | 04885 |
| g̱ | 04879 |
| ga | 04875 |
| ge | 04876 |
| gi | 04874 |
| go | 04878 |
| gu | 04873 |
| H | 04608 |
| h | 04613 |
| h' | 04613 |
| h\ | 0244 |
| h` | 04615 |
| ha | 04611 |
| he | 04612 |
| hi | 04610 |
| ho | 04614 |
| hu | 04609 |
| 'i | 04626 |
| -i | 04858 |
| I | 04928 |
| i | 04933 |
| i' | 04933 |
| i\ | 0245 |
| i` | 04935 |
| ia | 04931 |
| ie | 04932 |
| ii | 04930 |
| io | 04934 |
| iu | 04929 |
| j | 04869 |
| j' | 04869 |
| J | 04864 |
| j\ | 04871 |
| j` | 11662 |
| ja | 04867 |
| je | 04868 |
| ji | 04866 |
| jo | 04870 |
| ju | 04865 |
| K | 04776 |
| k' | 04781 |
| k | 04781 |
| k. | 04787 |
| k/ | 04784 |
| k; | 04788 |
| k[ | 04786 |
| k\ | 04787 |
| k] | 04789 |
| ḵ | 04783 |
| ka | 04779 |
| ke | 04780 |
| ki | 04778 |
| ko | 04782 |
| ku | 04777 |
| l | 04621 |
| l' | 04621 |
| L | 04616 |
| l\ | 04623 |
| l` | 11648 |
| la | 04619 |
| le | 04620 |
| li | 04618 |

| Key(s) | Unicode code point |
|---|---|
| lo | 04622 |
| lu | 04617 |
| M | 04632 |
| m | 04637 |
| m- | 04953 |
| m' | 04637 |
| m/ | 04992 |
| m; | 04994 |
| m[ | 04993 |
| m\ | 04639 |
| m] | 04995 |
| m̱ | 11649 |
| ma | 04635 |
| me | 04636 |
| mi | 04634 |
| mo | 04638 |
| mu | 04633 |
| N | 04752 |
| n' | 04757 |
| n | 04757 |
| n\ | 04759 |
| n` | 11656 |
| na | 04755 |
| ne | 04756 |
| ni | 04754 |
| no | 04758 |
| nu | 04753 |
| 'o | 04630 |
| O | 04760 |
| o | 04765 |
| o' | 04765 |
| -o | 04862 |
| o\ | 04767 |
| o` | 11657 |
| oa | 04763 |
| oe | 04764 |
| oi | 04762 |
| oo | 04766 |
| ou | 04761 |
| P | 04944 |
| p | 04949 |
| p' | 04949 |
| p/ | 05004 |
| p; | 05006 |
| p[ | 05005 |
| p\ | 04951 |
| p] | 05007 |
| p̱ | 11666 |
| pa | 04947 |
| pe | 04948 |
| pi | 04946 |
| po | 04950 |
| pu | 04945 |
| q | 04677 |
| q' | 04677 |
| Q | 04672 |
| q. | 04683 |
| q/ | 04680 |
| q; | 04684 |
| q[ | 04682 |
| q\ | 04683 |
| q] | 04685 |
| q̱ | 04679 |
| qa | 04675 |
| qe | 04676 |
| qi | 04674 |
| qo | 04678 |
| qu | 04673 |
| R | 04648 |
| r' | 04653 |
| r- | 04952 |
| r | 04653 |
| r\ | 04655 |
| r` | 11650 |
| ra | 04651 |
| re | 04652 |
| ri | 04650 |
| ro | 04654 |

TABLE 1-continued

| Key(s) | Unicode code point |
|---|---|
| ru | 04649 |
| S | 04656 |
| s | 04661 |
| s' | 04661 |
| s\ | 04663 |
| s` | 11651 |
| sa | 04659 |
| se | 04660 |
| si | 04658 |
| so | 04662 |
| su | 04657 |
| T | 04720 |
| t | 04725 |
| t' | 04725 |
| t\ | 04727 |
| t` | 11654 |
| ta | 04723 |
| te | 04724 |
| ti | 04722 |
| to | 04726 |
| tu | 04721 |
| 'u | 04625 |
| –u | 04857 |
| U | 04896 |
| u | 04901 |
| u' | 04901 |
| u\ | 04903 |
| u` | 11663 |
| ua | 04899 |
| ue | 04900 |
| ui | 04898 |
| uo | 04902 |
| uu | 04897 |
| V | 04664 |
| v' | 04669 |
| v | 04669 |
| v\ | 04671 |
| v` | 11652 |
| v1 | 11680 |
| v2 | 11681 |
| v3 | 11682 |
| v4 | 11683 |
| v5 | 11684 |
| v6 | 11685 |
| v7 | 11686 |
| va | 04667 |
| ve | 04668 |
| vi | 04666 |
| vo | 04670 |
| vu | 04665 |
| W | 04808 |
| w | 04813 |
| w' | 04813 |
| w` | 04815 |
| wa | 04811 |
| we | 04812 |
| wi | 04810 |
| wo | 04814 |
| wu | 04809 |
| X | 04904 |
| x | 04909 |
| x' | 04909 |
| x\ | 04911 |
| x` | 11664 |
| x1 | 11704 |
| x2 | 11705 |
| x3 | 11706 |
| x4 | 11707 |
| x5 | 11708 |
| x6 | 11709 |
| x7 | 11710 |
| xa | 04907 |
| xe | 04908 |
| xi | 04906 |
| xo | 04910 |
| xu | 04905 |
| y | 04845 |
| y' | 04845 |

TABLE 1-continued

| Key(s) | Unicode code point |
|---|---|
| Y | 04840 |
| y` | 04847 |
| ya | 04843 |
| ye | 04844 |
| yi | 04842 |
| yo | 04846 |
| yu | 04841 |
| Z | 04824 |
| z | 04829 |
| z' | 04829 |
| z\ | 04831 |
| z` | 11659 |
| za | 04827 |
| ze | 04828 |
| zi | 04826 |
| zo | 04830 |
| zu | 04825 |

What is claimed is:

1. A method of generating characters of a phonetic language using key presses inputted on a QWERTY keyboard, the method comprising:
   receiving at the QWERTY keyboard a first keystroke;
   in response to receiving the first keystroke, starting a timer, designating a first character a contingent character, and rendering the contingent character prior to the timer expiring;
   if the timer expires, accepting the contingent character;
   if a second keystroke is received at the QWERTY keyboard prior to the timer expiring, determining if the second keystroke is associated with one of a number of predetermined specifier keys associated with the first keystroke;
   if the second keystroke received prior to the timer expiring is not one of the predetermined specifier keys, accepting the contingent character and rendering a second character; and
   if the second keystroke received prior to the timer expiring is one of the predetermined specifier keys, removing the first character and rendering a third character.

2. The method of claim 1, wherein the predetermined specifier keys include a timing disable key, which if received as the second keystroke causes the previously rendered contingent character to be accepted and no other character is rendered in response to the second keystroke.

3. The method of claim 1, wherein at least the first, second and third characters are Ethiopic characters.

4. The method of claim 1, wherein rendering the first, second and third characters includes referencing a Unicode font library.

5. The method of claim 1, wherein for a particular first keystroke the predetermined specifier keys associated with the particular first keystroke include a plurality of predetermined specifier keys, wherein a group of characters including all third characters which can be rendered in response to a sufficient combination of the particular first keystroke and any of the predetermined specifier keys, includes an ordered expansion of the first character associated with the particular first keystroke.

6. The method of claim 5, wherein at least some of the predetermined specifier keys are associated with vowel keys, and at least one symbol key, and wherein the group of characters represent units of speech having a common consonant sound and a differing vowel sound.

7. The method of claim 1, wherein the predetermined specifier keys include a double-strike, a first alternative shift key, and a second alternative shift key, the double-strike being defined as the first keystroke received again as the second keystroke, wherein for the QWERTY keyboard keys having a shifted and a non-shifted symbol, the shifted and non-shifted symbol as assigned to second keystrokes based on the following priority:
   a) the double-strike;
   b) the first alternative shift key; and
   c) the second alternative shift key;
wherein the shifted symbol is assigned the highest available priority and the non-shifted symbol is assigned the next highest available priority.

8. The method of claim 1, wherein the predetermined time is adjustable.

9. A system of generating characters of a phonetic language using keystrokes inputted on a QWERTY keyboard, the system comprising:
   a character rendering module operable to receive a signal from the QWERTY keyboard indicating a first keystroke and the second keystroke, the character rendering module operable to send a signal to a monitor causing at least one character to be rendered, wherein a first character associated with the first keystroke is initially rendered and thereafter in response to a signal of non-affirmative correlation between the first keystroke and the second keystroke, a second character is rendered, and wherein in response to a signal of affirmative correlation between the first keystroke and the second keystroke, the first character is removed and a third character is rendered;
   a timing module in communication with the character rendering module, and operable to determine a time interval between the first keystroke and the second keystroke;
   a correlation module in communication with the character rendering module and the timing module, the correlation module operable to determine if the second keystroke is one of a number of predetermined specifier keys, wherein the correlation module provides the signal of non-affirmative correlation to the character rendering module if at least one of the following is true:
      (i) the second keystroke is not one of the predetermined specifier keys, and
      (ii) the time interval is greater than a predetermined time, and wherein the correlation module provides the signal of affirmative correlation to the character rendering module if the following is true:
      (i) the second keystroke is one of the predetermined specifier keys and the time interval is less than the predetermined time.

10. The system of claim 9, wherein the predetermined specifier keys include a disable key, wherein no further action is taken in response to a keystroke comprising the disable key that is received as the second keystroke.

11. The system of claim 9, wherein at least the first, second and third characters are Ethiopic characters.

12. The system of claim 9, wherein the character rendering module is operable to reference a Unicode font library when rendering the first, second and third characters.

13. The system of claim 9, wherein for a particular first keystroke the predetermined specifier keys associated with the particular first keystroke include a plurality of order specifier keys, wherein a group of characters including all third characters which can be rendered in response to a sufficient combination of the particular first keystroke and any of the predetermined specifier keys includes an ordered expansion of the first character associated with the particular first keystroke.

14. The system of claim 13, wherein the predetermined specifier keys are associated with vowel keys and the group of characters represent units of speech having a common consonant sound and a differing vowel sound.

15. The system of claim 9, wherein the predetermined specifier keys include a double-strike, a first alternative shift key, and a second alternative shift key, the double-strike being defined as the first keystroke received again as the second keystroke, wherein for the QWERTY keyboard keys having a shifted and a non-shifted symbol, the shifted and non-shifted symbol as assigned to second keystrokes based on the following priority:
   a) the double-strike;
   b) the first alternative shift key; and
   c) the second alternative shift key;
wherein the shifted symbol is assigned the highest available priority and the non-shifted symbol is assigned the next highest available priority.

16. The system of claim 9, wherein the predetermined time is adjustable.

17. A system Of generating characters of a phonetic language using keystrokes inputted on a QWERTY keyboard, the system comprising:
   means for receiving a first keystroke and a second keystroke at the QWERTY keyboard;
   means for rendering in communication with the means for receiving, wherein a first character associated with the first keystroke is initially rendered;
   means of timing in communication with the means for rendering and operable to determine a time interval between the first keystroke and the second keystroke;
   means for correlating in communication with the means for rendering and the means for timing, the means for correlating operable to determine if the second keystroke is one of a number predetermined specifier keys,
   wherein if at least one of the second keystroke is not one of the predetermined specifier keys and the time interval is greater than a predetermined time, the means for rendering renders a second character; and
   wherein if the second keystroke is one of the predetermined specifier keys and the time interval is less than a predetermined time, the means for rendering removes the first character and renders a third character.

18. The system of claim 17, wherein the predetermined specifier keys include a disable key, which if received as the second keystroke, no further action is taken.

19. The system of claim 17, wherein the predetermined time is adjustable.

20. The system of claim 17, wherein at least the first, second and third characters are Ethiopic characters.

* * * * *